United States Patent [19]

Ahearn et al.

[11] 3,729,724

[45] Apr. 24, 1973

[54] HIGH-DENSITY MAGNETO-OPTIC READOUT APPARATUS

[75] Inventors: William E. Ahearn; George Stanley Almasi, both of Purdy Station; Eugene Ronald Genovese, Yorktown Heights, all of, N.Y.

[73] Assignee: International Business Machines Corporation, Armonk, N.Y.

[22] Filed: June 8, 1971

[21] Appl. No.: 151,047

[52] U.S. Cl. .340/174 YC, 340/174 TF, 340/174 SR, 350/151, 331/94.5

[51] Int. Cl. ....................G11c 11/14, G11c 11/42

[58] Field of Search ...............340/174 TF; 350/151; 331/94.5

[56] References Cited

UNITED STATES PATENTS 3,503,054 3/1970 Bobeck et al. ..................340/174 TF 3,614,447 10/1971 Paoli ..................................331/94.5

*Primary Examiner*—James W. Moffitt

*Attorney*—Hanifin and Jancin and M. H. Klitzman

[57] ABSTRACT

The presence and absence of cylindrical domains in a magnetic material is determined by using either the Faraday or Kerr effect in conjunction with two semiconductor lasers. When both lasers are biased just below their lasing thresholds, the magnetic material, in conjunction with the cylindrical domains, functions as a Q-switch wherein the cylindrical domains establish an optical cavity when they enter the optical path between the two lasers. When one laser is biased just below its lasing threshold and the other is biased in its lasing mode, the apparatus functions in a source-detector mode. The apparatus operating in either mode is very adaptable for multicell or array implementation.

6 Claims, 5 Drawing Figures

Patented April 24, 1973 3,729,724

3 Sheets-Sheet 1

INVENTORS
WILLIAM E. AHEARN
GEORGE S. ALMASI
EUGENE R. GENOVESE

BY Maurice H. Klitzman
ATTORNEY

HIGH-DENSITY MAGNETO-OPTIC READOUT APPARATUS

FIELD OF THE INVENTION

This invention relates to a magneto-optic read-out device and more specifically to a device which utilizes two semiconductor lasers to determine the presence and absence of cylindrical, single wall domains in a magnetic material.

BACKGROUND OF THE INVENTION

Various types of magnetic materials such as orthoferrites, magnetoplumbites, and garnets have been found to support cylindrical single wall domains. These domains are self-enclosed regions within the magnetic material having their easy axis magnetization vectors oppositely directed to that of the surrounding region. Through numerous propagation techniques, usually employing permalloy patterns printed on the surface of the magnetic material, various devices have been constructed using these cylindrical domains. Many of these devices, especially memories, require readout apparatus. Since the magnetization vector of these cylindrical, single wall domains is opposite to the surrounding material, optical readout techniques utilizing the Faraday effect or Kerr effect have been explored. Apparatus utilizing the Faraday effect directs a beam of polarized light through the magnetic material. When no cylindrical domains are present in the interrogation area, the magnetization of the magnetic material causes the polarized light to be rotated by a specific angle in one direction. However, if a cylindrical domain is present in the interrogation area, the magnetization vector of the domain causes the polarized light to be rotated by a similar angle, but in the opposite direction. Thus, light emerging from the magnetic material has one of two possible angles of polarization. Using a polarizing plate, as an analyzer, light with one angle of polarization is permitted to pass while light with the other angle of polarization is essentially blocked. The light which is permitted to pass impinges upon a detector, such as a photodiode, and the presence of a cylindrical domain is detected. Apparatus utilizing the Kerr effect is similar to that utilizing the Faraday effect except that the polarized light is reflected rather than passed by the magnetic material.

Lasers have been suggested as sources of electromagnetic radiation for the readout apparatus. Usually these lasers have been of the gaseous or solid-state type, capable of continuous or heavy duty cycle operation at room temperatures. With the recent advances in heterostructure semiconductor injection lasers, apparatus requiring continuous or heavy duty cycle operation may be constructed for operation at room temperatures without much of the previously required cooling systems.

Difficulties arise in selecting the type of detector to be used in the readout apparatus. Photo-emissive detectors, solid-state photodiodes, avalanche photodiodes and photoconductive detectors have been employed as detectors in these apparatus. Selection of these detectors usually results in optimizing particular characteristics of the detector at the expense of other characteristics. For example, avalanche photodiodes exhibit internal gain characteristics which are desirable for enhancing the sensitivity and signal-to-noise ratio of the detector but such detectors must be operated at relatively high bias voltages and the multiplication process itself has some degrading effects upon the signal-to-noise ratio. Other detectors in which fast response and high efficiencies are achieved require that the detector be operated at a very low temperature or exhibit no internal gain characteristics. The apparatus for low temperature operation is costly and, in many instances, limits the types of environment in which the detector may be used. In other words, high speed detectors are achieved only at the expense of other desired characteristics and advantages.

Packaging problems have also plagued prior art detection apparatus. For example, when multiple detection units are involved and a single light source is used, severe alignment problems result because of the various angles involved. Furthermore, the physical size of the unit itself becomes prohibitive. If multiple sources are used, temperature problems may result requiring various heat sinks or cooling systems. In these systems, the size of the detectors may also be limited by the minimum area of sensitivity.

The physical size of both the source and detector as well as the diameter of the radiation from the source become more critical as the diameter of the cylindrical domains is reduced. The size of the domains determines the domain density and thus, the information storage capacity of the device. However, once the smaller domains have been achieved, the size of the detection apparatus becomes the limiting factor. Apparatus of suitable physical size which also exhibits the desirable characteristics of high internal gain, fast response times, room temperature operation without elaborate cooling systems, and low power requirements is non-existent in the prior art.

Accordingly, a principal object of this invention is to detect cylindrical domains in a magnetic material using an improved magneto-optic readout apparatus.

Another object of this invention is to increase the packing density capability of magneto-optic readout apparatus.

Another object of this invention is to achieve fast and efficient readout, at room temperatures, of high density cylindrical magnetic domain devices.

Another object of this invention is to improve the sensitivity of a magneto-optic readout apparatus for a cylindrical domain device without requiring high bias voltages and without degrading the signal-to-noise ratio of the apparatus.

SUMMARY OF THE INVENTION

The above objects are accomplished by placing polarizing plates on either side of a magnetic chip in which magnetic, cylindrical domains exist, each functioning as both a polarizer and an analyzer. A semiconductor laser is placed on either side of the magnetic chip such that the junction of each laser is directed toward the junction of the other, effectively establishing a single laser cavity. Each laser is biased slightly below its lasing threshold. Spontaneous emissions from the semiconductor lasers, which are polarized to some extent, pass through the first polarizing plate, and become highly polarized. When a cylindrical domain is not present in the interrogation area, the highly polarized light passes through the magnetic material and is blocked by the second polarizing plate. When a cylindrical domain enters the interrogation area of the magnetic material, the angle of polarization of the second polarizing plate is orientated to permit this light to pass and impinge upon the second semiconductor laser junction. This activity takes place in both directions. The increased energy at the junctions pump both lasers into their lasing modes. This transition into the lasing mode produces very high gain which significantly enhances the signal-to-noise ratio and, thus, the sensitivity of the apparatus.

The magnetic material functions as a "Q-spoiler" in which a laser cavity is created when a cylindrical domain is present in the interrogation area of the material. In other words, the resonant cavity established by the two semiconductor lasers is interrupted by the magnetic material, and the presence of a cylindrical, single wall domain re-establishes that cavity. Since the lasers lase only when a cylindrical domain is present, much higher duty cycles are permissible without the temperature problems of previous devices.

The use of semiconductor lasers as both light "sources" and light "detectors" permits high density packing. This high density packing, in which the junctions of the lasers are within close proximity to one another, reduces beam divergency and permits the use of very small diameter cylindrical domains. While the invention is described utilizing the Faraday effect, the same concept may be implemented utilizing the Kerr effect.

These and other novel features of the invention together with further objects and advantages thereof will become apparent in the following detailed specification and the accompanying drawings.

DETAILED DESCRIPTION

Figure 1:
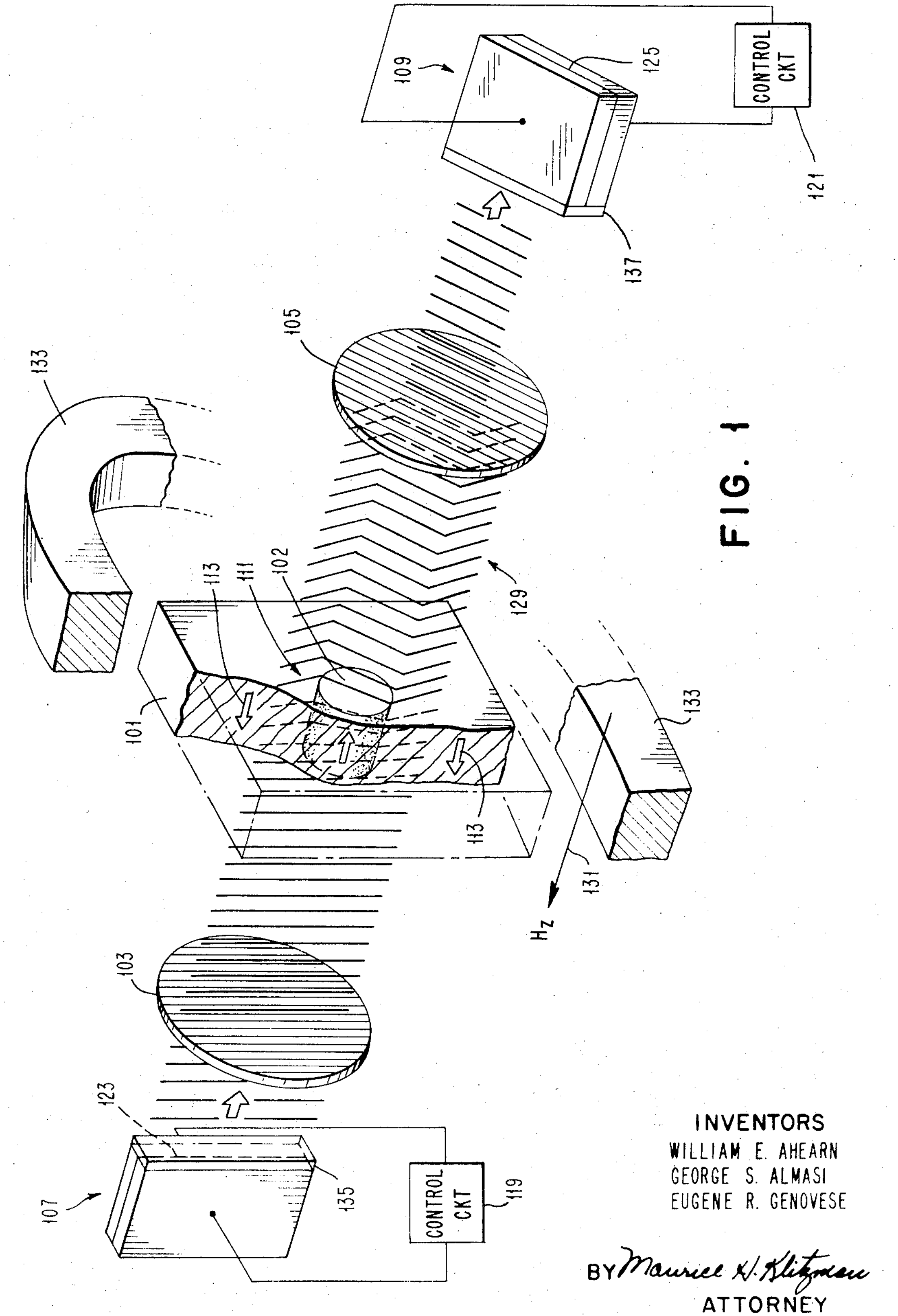
FIG. 1 shows a conceptual view of the invention utilizing the Faraday effect.

FIG. 1 shows a conceptual view of the read-out apparatus, indicating the functions of the various components. Magnetic material 101 is of a type in which cylindrical, single wall domains can be maintained. Examples of such magnetic materials are rare earth orthoferrites, garnets, and magnetoplumbites. Cylindrical domains such as domain 102 are maintained within magnetic material 101 by applying a bias or stabilizing field H perpendicular to the plane of magnetic material 101 as indicated by arrow 131. Although bias field source 133 is shown as a coil, this source may be a permanent magnetic material located adjacent to magnetic chip 101, as illustrated in U.S. Pat. No. 3,529,303. Magnetic material 101 is characterized as having its easy axis magnetization vector 113 perpendicular to the plane of the material. Cylindrical domains existing in magnetic material 101 are characterized as having the direction of their easy axis of magnetization opposite to that of magnetic material 101. For a discussion of the theory of cylindrical, single wall domains the article entitled "Application of Orthoferrites to Domain-Wall Devices" by Bobeck, et al. in the IEEE Transactions on Magnetics, Vol. MAG-5, No. 3, September, 1969, pages 544–553 should be consulted. The area in which the presence of cylindrical domains is detected is designated as interrogation area 111. Polarizing plates 103 and 105 are placed on either side of magnetic material 101 in the region of interrogation area 111. The angles of polarization of polarizing plates 103 and 105 are orientated so as to have a specific relative angle with respect to one another. This relative angle is determined by the angle and direction through which a beam of polarized light is rotated when passing through magnetic material 101, and is adjusted to give optimum signal-to-noise ratio. It is at least equal to twice the angle of magneto-optic rotation. Polarizing plates 103 and 105 are adjusted such that rotated polarized light 129 will be passed by plates 103 and 105 after exiting from magnetic material 101, only when domain 102 is present in interrogation area 111. It should be pointed out that polarizing plates 103 and 105 are utilized to enhance the operation of the apparatus and are not necessary to its operation. The reason for this being semiconductor laser diodes, in general, emit partially polarized light and also have demonstrated ability to discriminate angles of polarization of radiation impinging upon their junctions.

Semiconductor laser diodes 107 and 109 are situated on either side of magnetic material 101. Junction 123 of semiconductor laser 107 is aligned parallel with the angle of polarization of polarizing plate 103 and junction 125 of semiconductor laser 109 is aligned parallel with the angle of polarization of polarizing plate 105. Semiconductor laser 107 is connected to control and detection circuitry 119 and semiconductor laser 109 is connected to control and detection circuitry 121. The control and detection circuitries 119 and 121 have similar functions in that both provide the operating biases for semiconductor laser diodes 107 and 109, respectively. Control and detection circuitries 119 and 121 also contain circuitry for indicating when the semiconductor laser diodes 107 and 109, respectively, are pumped into their lasing modes.

The biasing circuits of control and detection circuitries 119 and 121 are generally D.C. voltage supplies. Since semiconductor laser diodes are used, power requirements of the bias circuitries and bias voltages are low. The detection circuitry may take various forms. For example, one in which any change in the current of the bias circuitry of either laser is detected, indicating when the laser is pumped into its lasing mode.

The problem of beam divergence, inherent in semiconductor lasers, is minimized by lenses 135 and 137 as shown in FIG. 1. Lenses 135 and 137 implicitly are of the lenticular type; i.e., one element per laser. Fiber optics as well as other types of lenses are possible.

Figure 2:
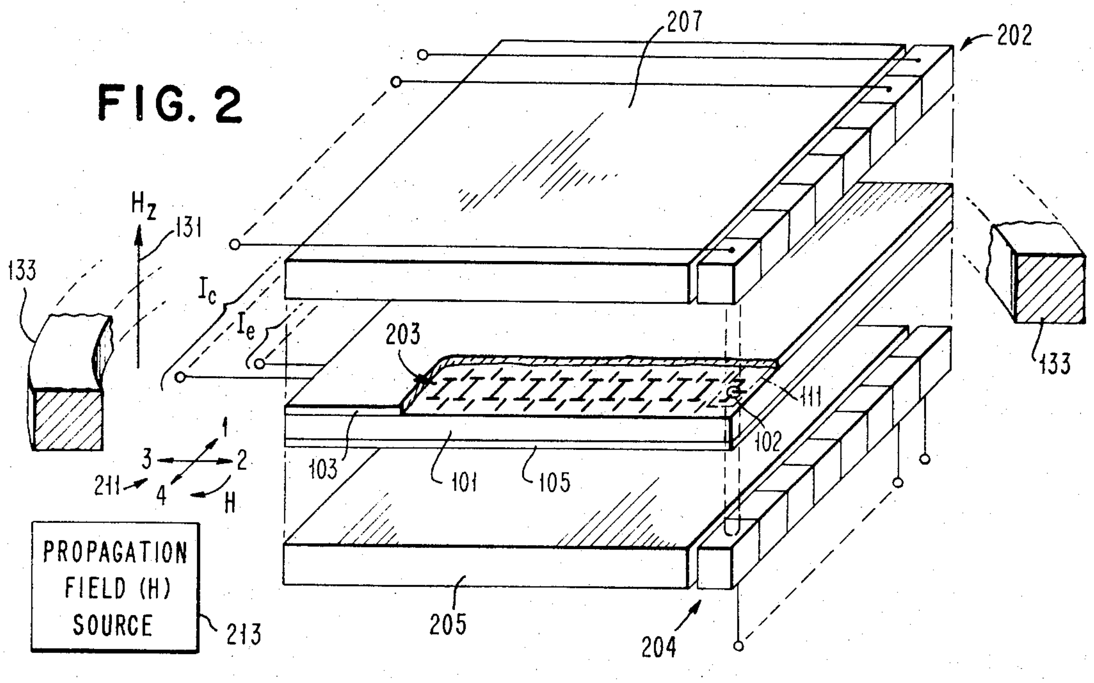
FIG. 2 shows the implementation of the invention in a memory environment.

FIG. 2 shows the apparatus of FIG. 1 incorporated into a memory environment. Magnetic material 101 is a planar chip material of the type in which cylindrical domains can be maintained. Deposited onto the surface of magnetic material 101 are propagating means comprised of propagation paths 203 which direct the flow of single wall domains in magnetic material 101 in conjunction with propagation field H (indicated by rotating arrow 211) produced by propagation source 213. Propagation path 203 can comprise permalloy material in a particular pattern which functions as a guide for cylindrical domains. Patterns, such as T-Bar, Angle-fish, or Zig-Zag elements, are presently in use. These patterns usually require a rotating magnetic field H to propagate the cylindrical domains. Propagation paths 203 are arranged so as to direct the cylindrical domains through interrogation area 111, where their presence is detected. The propagation paths 203 in conjunction with the propagation field 211 constitutes a propagation means. It should be pointed out that the permalloy patterns need not be printed directly onto the surface of magnetic material 101, but may also be borne by a separate substrate whose surface is brought in close proximity to the surface of magnetic material 101.

Polarizing plates 103 and 105 are placed on either side of magnetic material 101 such that their axes of polarization are at a predetermined relative angle to one another. This relative angle is twice the angle through which polarized light is rotated when passing through magnetic material 101. According to the Faraday effect, the magnitude of the angle will be determined by the magnitude of the magnetization of magnetic material 101 and the direction of rotation will be determined by the direction of the magnetization vector of interrogation area 111. Thus, the axes of polarization of plates 103 and 105 are orientated such that when a cylindrical domain is present in interrogation area 111, light polarized by plate 103 passes through magnetic material 101 and, due to the magnetization vector of the cylindrical domain, is rotated in a particular direction before striking plate 105. Plate 105 is orientated such that light having a polarization indicative of the presence of a cylindrical domain will pass through it. If, on the other hand, a cylindrical domain is not present in interrogation area 111 the light polarized by plate 103, will be rotated in the other direction upon passage through magnetic material 101. Since the angle of polarization of plate 105 is not the same as the angle of polarization of this impinging light, plate 105 functions as a barrier to that light.

Semiconductor laser diode arrays 202 and 204 are placed on either side of magnetic material 101. Arrays 202 and 204 are comprised of laser diodes such as diodes 107 and 109 of FIG. 1. Semiconductor laser array 202 is situated such that the junction of each laser in the array is parallel to the angle of polarization of plate 103. Similarly, the junctions of laser array 204 are situated parallel to the angle of polarization of plate 105. For each individual laser in laser array 202 there is a corresponding laser opposite it in array 204. Each laser in array 202 faces a laser in array 204 and the area of magnetic material 101 which interrupts the optical path 201 between each pair of lasers in arrays 202 and 204 constitutes interrogation area 111. Thus, each pair of lasers facing one another having a relative angle between their junctions equal to the relative angle between the axes of the polarized plates 103 and 105.

Although, as was pointed out above, polarization plates 103 and 105 are not necessary for the device to function, such plates enhance the operation of the apparatus, without appreciably adding to the bulk of the apparatus, since they are extremely thin. Their use permits the apparatus to be constructed without the requirement of the relative angles between the junction of laser arrays 202 and 204.

The mode of operation of such a device as shown in FIG. 2 and the type of semiconductor laser chosen will dictate the degree and type of cooling necessary. Recent developments in heterostructure injection lasers, which may be operated in a continuous mode at room temperature, permit such a device as depicted in FIG. 2 to be constructed with minimal cooling system requirements.

The semiconductor lasers of array 202 need not be the same type as those of array 204; however, when both semiconductor laser arrays 202 and 204 utilize the same lasing material, maximum sensitivity is obtained. This is due to the matched wavelength properties of the lasers, there being no appreciable change in wavelength when the polarized light passes through magnetic material 101. Further, laser materials which operate at particular wavelengths may be matched with magnetic material 101 to further enhance the operation of the apparatus. For example, gallium arsenide laser diodes are particularly suitable in combination with orthoferrite magnetic materials.

Spacers 205 and 207 in FIG. 2 is used simply for spacing and mechanical stability may contain means for producing stabilizing field $H_\epsilon$ and/or propagation field H. The use of spacers 205 and 207 enables memory units to be stacked upon one another. Such compact stacking results in high density memory systems in which additional information handling capability may be added with minimum difficulty.

Figure 3:
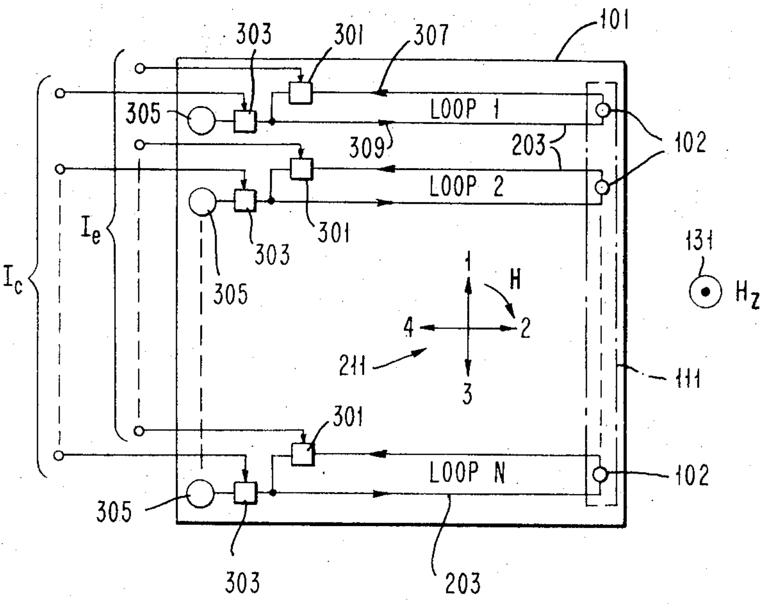
FIG. 3 shows an arrangement of a magnetic, cylindrical domain type memory in which the apparatus may be used as a readout device.

FIG. 3 shows a propagation path arrangement which may be used in the apparatus described in FIG. 2. In FIG. 3 each propagation path 203 is arranged in a closed-loop configuration. Cylindrical domains 102 are created by cylindrical domain generators 305 and are gated into the closed-loops by cylindrical domain writers 303. One example of a domain generator is a magnetically soft permalloy disk as described in U.S. Pat. No. 3,555,527. The disk has a domain permanently associated with it which travels around the periphery of the disk as the propagation field H rotates. The domain is also attracted by propagation path 203, causing the domain to be stretched. If the stretching forces are strong enough, the domain divides into two domains, one of which remains on the disk while the other propagates along path 203. In order to write a domain into the memory at any desired time using this generation technique, the disk is positioned relative to a propagation path 203 so that the attracting force of propagation path 203 is slightly less than that which is sufficient to cause domain division. Current in a conductor loop located between the disk and propagation path 203 provides an additional magnetic field which combines with the propagation field H to cause domain division, thereby "writing" a domain into path 203.

Bias field $H_\epsilon$ , which is normal to the plane of magnet material 101, stabilizes the cylindrical domains in magnetic material 101. Propagation field $H_7$ which is an in-plane field, rotating at a specified frequency, causes the cylindrical domains to propagate in a direction shown by arrow 309. The cylindrical domains 102 pass through interrogation area 111 and return in the direction indicated by arrow 307. Should it be desired to remove the information from the closed-loop paths, cylindrical domain erasers 301 perform this erasure function. A possible implementation of a domain eraser is a conductor loop. (not shown) When a cylindrical domain 102 scheduled to be erased enters the conductor loop, the loop is pulsed so as to significantly increase the stabilizing field in the area of the loop, causing the domain to collapse. Otherwise, the cylindrical domains continuously circulate through the closed-loop paths 203.

Each closed-loop path represents a storage area for a specified number of bits, depending upon the maximum number of bits which may be circulated in one path. Since each closed-loop path operates independently of the other paths on the chip 101, closed-loop paths not in use may be disengaged without affecting the operation of those paths in use. The presence and absence of cylindrical domains 102 in interrogation area 111 are detected by the apparatus as shown in FIG. 2, which is synchronized with the flow of the domains, permitting the stored information to be read nondestructively.

Figure 4:
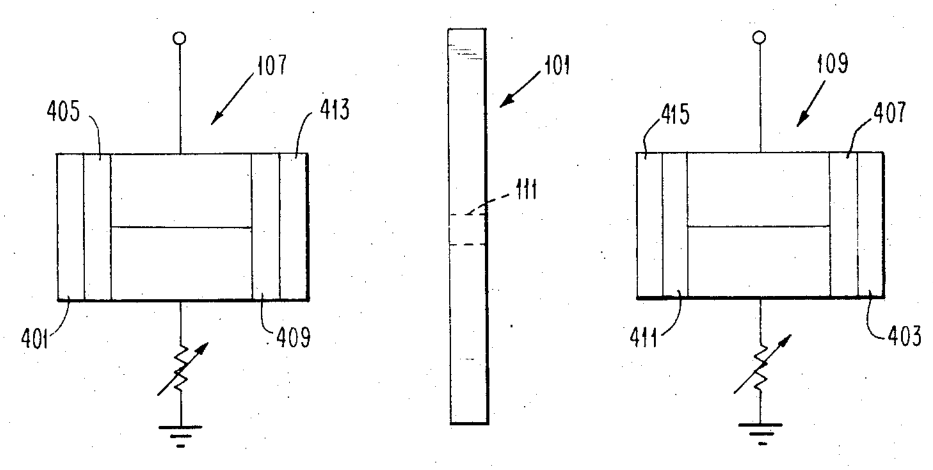
FIG. 4 shows schematically the required orientation and position of the semiconductor lasers for operation in the preferred embodiment.

FIG. 4 shows a schematic representation of one detection cell indicating the various coatings required upon semiconductor lasers 107 and 109 of FIG. 1. The coatings required upon semiconductor lasers 107 and 109 are determined by the mode in which the unit will operate. In the preferred embodiment, semiconductor lasers 107 and 109 function as a single lasing unit, both being biased below their lasing thresholds. In such an operating mode, antireflecting coatings 409 and 411 are required to minimize reflections within the individual lasers. Silicon monoxide is a typical composition used as an antireflective coating. Similarly, reflective coatings 401 and 403 are required so that lasing may occur when an optical cavity between each reflective coating is completed. Aluminum is commonly used as a reflective coating. Since reflective coatings 401 and 403 are usually of a metallic composition, coatings 405 and 407 are employed as electrical insulators between end reflective coatings 401 and 403 on semiconductor lasers 107 and 109. Silicon monoxide is a material used for such electrical insulation.

Since the emissions from semiconductor laser diodes are subject to divergence, converging lenses 413 and 415 may be placed upon the ends of semiconductor lasers 107 and 109. Such lenses 413 and 415 will enhance the operation of the apparatus and permit closer spacing of the semiconductor lasers in arrays 202 and 204 as shown in FIG. 2.

Figure 5:
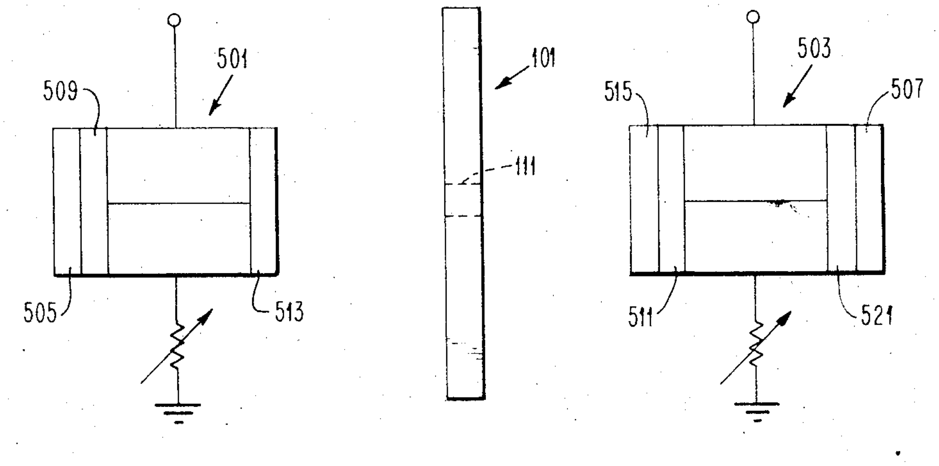
FIG. 5 shows schematically the orientation and location of the semiconductor lasers for use in an alternate embodiment of the invention.

FIG. 5 shows a schematic representation of one detection cell indicating the various coatings required upon semiconductor lasers 501 and 503 when the cell is operated in an alternate mode from that described above. In the alternate mode of operation, semiconductor laser 501 operates in a continuous or pulsed mode and functions as a source of coherent radiation. Semiconductor laser 503 is biased slightly below its lasing mode and functions as a detector of polarized coherent radiation. Source laser 501 requires a reflective end coding 505 separated by an electrical insulator 509. As previously mentioned, electrical insulator 509, silicon monoxide, for example, is also necessary because of the high conductivity of reflective end coating 505, aluminum, for example. Detector laser 503 similarily requires a reflective end coating 507 separated by an electrical insulator 521. Since semiconductor laser 503 is operating in a detection mode, nonreflective coating 511 is required. Further, as in the case of the apparatus of FIG. 4, converging lenses 513 and 515 may be used to reduce the divergence of the emissions between laser source 501 and laser detector 503.

STATEMENT OF OPERATION

The statement of operation of the preferred embodiment as shown in FIG. 2 is described using the configuration as shown in FIG. 3. Referring to FIG. 3, cylindrical domains 102 are created by cylindrical domain generator 305 and gated into the closed-loop path 203 by cylindrical domain writer 303. Stabilizing field $H_\epsilon$ (131) maintains the cylindrical domains 102 in magnetic material 101. Rotating propagation field H (211) causes the cylindrical domains to propagate around the closed-loop paths 203 at a frequency determined by the rotation frequency of field H. If the detection apparatus is synchronized with the rate of propagation of the cylindrical domains, the presence or absence of domain 102 at a particular time and at a particular location (interrogation area 111) can be sensed, thereby providing a serial memory in which the pattern of the domains represents the data stored. For example, the presence of a cylindrical domain 102 in interrogation area 111 at a particular time, can indicate a "one" state and the absence of a cylindrical domain 102 in interrogation area 111 at the same time can indicate a "zero" state.

In the preferred operation mode, laser arrays 202 and 204 in FIG. 2 are biased slightly below their lasing thresholds. Spontaneous emissions from any two lasers facing one another are highly polarized by polarizing plates 103 and 105 and pass through magnetic material 101. If no cylindrical domain 102 is present in interrogation area 111, the polarized radiation is rotated in a particular direction through apparticular angle, depending upon the direction and magnitude of the magnetization vector of magnetic material 101. Having been rotated by magnetic material 101, the polarized radiation then impinges upon polarizing plates 103 and 105, which act as barriers to the polarized radiation. A "zero" state is registered. However, if a cylindrical domain 102 is present in interrogation area 111, the polarized radiation will be rotated through a similar angle but in the opposite direction. Upon passing through magnetic material 101, the rotated polarized radiation will impinge upon polarizing plates 103 and 105. Due to the relative angle between the polarizing plates, this radiation will be permitted to pass and impinge upon the junctions of the opposite lasers in arrays 202 and 204. This additional energy at the junction of the semiconductor lasers causes hole-electron pairs to be generated, pumping both lasers into their lasing modes. This mode change of the semiconductor lasers results in current change in their bias circuits. This current change is detected and a "one" state is identified.

In an alternate operating mode, semiconductor laser array 202 acts as a source array and semiconductor array 204 acts as a detector array. In this mode of operation semiconductor lasers in the source array 202, are either pulsed or continuously maintained in their lasing mode. Their counterparts in detector array 204 are biased slightly below their lasing threshold. In a similar manner as described in the preferred operation mode, lasers in detector array 204 are pumped into their lasing mode only when a cylindrical domain 102 is present in interrogation area 111.

While both the preferred and alternate mode of operation of the device have been described such that semiconductor lasers are pumped into their lasing mode with the presence of a single wall domain in interrogation area 111, it should be noted that the opposite situation may exist, requiring the relative angle between the semiconductor laser diode junctions and the relative angle between the polarization angles of polarization plates 103 and 105 to be adjusted accordingly. Further, it should be pointed out that while the apparatus and the operation of the apparatus have been described utilizing the Faraday effect, a similar apparatus and operation is possible utilizing the Kerr effect. In such a situation, the polarized radiation would be reflected from the magnetic material 101 rather than being transmitted through it.

The advantages of this device are readily apparent. Since laser arrays are within the state of the present art, this invention presents the advantage of high packing density. Further, the apparatus offers high sensitivity with low power requirements. High gains associated with semiconductor lasers further improve the signal-to-noise ratio of systems using this improved sensing technique.

While the invention has been particularly shown and described with reference to the preferred embodiment thereof, it will be understood by those of skill in the art that various changes in form and details may be made therein without departing from the spirit and scope of the invention.

We claim:

1. A magneto-optic system comprising:
   - a first semiconducting laser biased below its laser mode threshold with its emissive surface directed positively along an optical axis and oriented to emit polarized light in a first plane lying along said axis,
   - a second semiconducting laser biased below its laser mode threshold with its emissive surface directed negatively along said optical axis and oriented to emit polarized light in a second plane lying along said axis and displaced by a first angle from said first plane,
   - a transparent magnetic material in which cylindrical, single wall domains can be maintained, located along said optical axis between said first and said second semiconducting lasers,
   - a propagation means associated with said magnetic material directing said domains along a propagation path and through an interrogation area located on said optical axis within said material,
   - said magnetic material capable of rotating the plane of polarization for polarized light emitted by either said first of said second semiconducting laser, through said first angle when a cylindrical, single wall domain is located in said interrogation area, thereby permitting the light from said first semiconducting laser impinging upon the emissive surface of said second laser to pump said second semiconducting laser into its lasing mode, and permitting the light from said second semiconducting laser impinging upon the emissive surface of said first semiconducting laser, to pump said first semiconducting laser into its lasing mode,
   - said magnetic material capable of rotating the plane of polarization for polarized light emitted by either said first of said second semiconducting laser, through a second angle different from said first angle when no cylindrical, single wall domain is located in said interrogation area, thereby preventing the operation of said first and said second semiconducting lasers in their laser mode,
   - control circuitry for biasing said first and said second semiconductor laser and for detecting when said semiconductor lasers enter into their lasing mode,
   - whereby the event of a cylindrical, single wall domain being located in the interrogation area, can be detected.

2. The magneto-optic system of claim 1 which further comprises:
   - a first polarizer plate located perpendicular to and along said optical axis between said first semiconducting laser and said magnetic material, oriented to transmit polarized light in said first plane,
   - a second polarizer plate located perpendicular to and along said optical axis between said second semiconducting laser and said magnetic material, oriented to transmit polarized light in said second plane.

3. The magneto-optic system of claim 1, which further comprises:
   - a first lens located between said first semiconductor laser and said magnetic material,
   - a second lens located between said second semiconductor laser and said magnetic material,
   - said first and second lenses reducing beam divergence for the light emitted by said first and said second lasers.

4. The magneto-optic system of claim 1, wherein said first and second semiconductor lasers are gallium arsenide lasers.

5. The magneto-optic system of claim 1, which further comprises:
   - a biasing means for maintaining said domains in said magnetic material.

6. The magneto-optic system of claim 1, which further comprises:
   - a generating means for generating said domains in said propagation path,
   - a gating means associated with aid propagation path for gating said domains into aid propagation path,
   - an erasing means associated with said propagation path for erasing said domains propagating within said propagation path.

* * * * *